Oct. 7, 1958   HANS-JOACHIM M. FOERSTER   2,854,862
SPEED CHANGE TRANSMISSION
Filed July 9, 1952

Inventor
Hans-Joachim M. Foerster
By Dicke and Padlon
ATTORNEYS

United States Patent Office 2,854,862
Patented Oct. 7, 1958

2,854,862

SPEED CHANGE TRANSMISSION

Hans-Joachim M. Foerster, Stuttgart-Bad Cannstatt, Germany, assignor to Daimler-Benz Aktiengesellschaft, Stuttgart-Unterturkheim, Germany Application July 9, 1952, Serial No. 297,960

Claims priority, application Germany July 11, 1951

30 Claims. (Cl. 74—682)

My invention relates to a speed change transmission, particularly for motor vehicles. More specifically, my invention is concerned with a speed change transmission of the type including a plurality of epicyclic gear trains arranged in tandem, main one-way clutches and counter one-way clutches being provided for the purpose of securing a transfer of the driving torque during the interval in which a gear-shifting operation occurs.

A transmission of that type is disclosed in the copending application Serial No. 271,212 filed on February 12, 1952, by Kümmich, now Patent No. 2,764,904.

It is an object of the present invention to provide a speed change transmission of the afore-stated type which is simple in design and reliable in operation. More particularly, it is an object of the invention to provide a speed change transmission including a plurality of epicyclic gear trains, one-way clutches, brakes and clutches in which the majority of such brakes and clutches will be operated at a time when there is no relative rotation of the co-operating elements, thus securing the advantage that there will be no wear and dissipation of energy, and that consequently the clutches may be toothed clutches or other simple clutches involving conical elements or expandable rings, such clutches being capable of simple actuation by fluid-operated means and being adapted to transfer a very high specific load.

Further objects of the invention will appear from the description of a preferred embodiment of the invention following hereinafter, but I wish it to be clearly understood that such detailed description serves the purpose of illustration rather than that of limitation of the invention.

Figure 6:
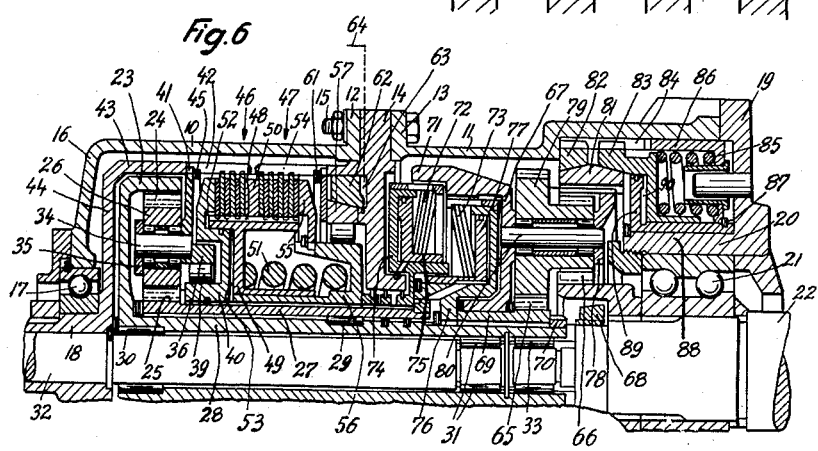
Fig. 6 is an axial section through my novel transmission adapted to be set to four different ratios of transmission.

The housing of the transmission shown in Fig. 6 comprises the substantially cylindrical sections 10 and 11 provided with peripheral flanges 12 and 13 fixed to opposite sides of a partition wall 14 by bolts 15. The housing section 10 has an end wall 16 having a central aperture in which a ball bearing 17 is mounted in which the hollow driving shaft 18 is journalled.

The housing section 11 is closed by an annular end wall 19 integral with a cylindrical sleeve-shaped portion 20 in which a ball bearing 21 is mounted rotatably supporting the driven shaft 2. The first epicyclic gear train comprises a cup-shaped gear 23 having internal teeth 24, a sun gear 25 and three epicyclic gears 26 meshing with both. The sun gear 25 has a sleeve-shaped hub 27 which surrounds and is journalled on a hollow shaft 28 by means of rollers 29. Preferably, the sleeve 27 which forms a hollow shaft is slightly spaced from shaft 28, and the rollers 29 are disposed at a considerable distance from the teeth of the sun gear 25, whereby the latter is given freedom of radial self-adjustment to secure a uniform transfer of the torque to the three epicyclic gears.

The cup-shaped internal gear 23 is integral with the hollow shaft 28, and the letter is journalled by two sets of rollers 30 and 31 on a shaft 32 on which the hollow driving shaft 18 is mounted.

The driven shaft 2 extends into the end of the hollow shaft 28 and is journalled therein by a set of rollers 33.

The epicyclic gears 26 are rotatably mounted on studs 34 which extend between and are secured in two co-axial ring-shaped members 35 and 36. The member 36 is so shaped as to provide for seating faces (not shown) for the member 35 in the space left between the gears 26, and the two members 35 and 36 are firmly bolted together to form a rigid planetary gear carrier. This gear carrier is mounted for common rotation with the driving shaft 18. To this end, the member 36 of the planetary gear carrier has external teeth 41 engaging axial slots 42 provided in the cylindrical flange 43 of a cup-shaped extension 44 of the driving shaft 18. Owing to this arrangement, the planetary gear carrier 36, 35 has freedom of radial self-adjustment to a certain extent, whereby a uniform transfer of the driving couple from the internal teeth 24 to the three epicyclic gears 26 is promoted. A split ring 45 sprung into an internal groove of flange 43 holds the teeth 41 in position within the inner ends of the slots 42. The internal wall of gear carrier member 36 is provided with a plurality of pockets, each pocket comprising a radial wall 37 and a wall 38, which extends at an acute angle to the radius. Each pocket contains a clamping roller 39 adapted to roll on the cylindrical periphery of an element 40 which is splined on shaft 27 for common revolution therewith. The clamping rollers 39 and the associated elements constitute a main one-way clutch.

Means are provided to alternatively clutch the sun gear 25 either to the driving shaft 18 or to the housing. For that purpose two groups of multi-disk friction devices are provided, one group being designated by 46, and the other group by 47 as a whole.

Each group comprises two interleaved sets of plane annular disks of different diameters. The larger disks of group 46 have peripheral projections engaging the slots 42 of flange 43 and will thus rotate in unison with the driving shaft 18. The smaller disks of group 46 have internal projections engaging longitudinal grooves 48 provided on the periphery of a drum 49, which is splined on the hollow shaft 27. On its periphery the drum 49 carries a ring-shaped actuating disk 50 which is splined on the drum and is held in position on the drum by split rings engaging suitable groves in the periphery of the drum and located on either side of the actuated disk 50. The drum 49 and the actuator disk 50 fixed thereto are axially movable. A helical spring 51 surrounding the hub portion of the drum 49 bears against the end wall of drum 49 tending to move the same to the left, whereby the actuator 50 will press the group 46 of friction disk upon each other and upon the adjacent plane face of the member 40, which is held against axial displacement on shaft 27 by an interposed split ring. Therefore, the group 46 of friction disk when thus pressed together will tend to clutch the elements 49 and 43 thereby connecting the driving shaft 18 to the sun gear 25 for common rotation.

The member 40 is formed with a circular recess 52 having a cylindrical inner face which is slidably engaged by a cylindrical flange of drum 49 and provided with a groove accommodating a piston ring. When a fluid under pressure is admitted to the space 53 between the element 40 and the drum 49 through a suitable conduit the drum 49 will be urged towards the right against the force exerted by spring 51 thereby relieving the group 48 of friction disks from pressure and compressing the group 47 of friction disks. Thus upon movement of the drum 49 toward the right against the forces exerted by the spring 51 the multi-disc friction device 46 is first disengaged, and the multi-disc friction device 47 is thereupon engaged, whereby both friction devices 46 and 47 are disengaged in an intermediate position of the drum 49. The group 47 is composed of larger disks having projections engaging longitudinal grooves 54 provided in a cylindrical flange of wall 14, and of smaller disks having inner projections engaging the grooves 48 of the drum 49. The group 47 of disks abuts against a ring 55, which is supported by a ring-shaped member 56 splined on shaft 27 for common rotation. For this purpose a cylindrical flange of the member 56 has recesses engaged by internal teeth of ring 55, the latter being held in position by a split ring inserted in a groove of member 56 as will appear from Fig. 6. Thus, a compression of the group 47 of friction disks by the fluid actuated drum 49 will clutch the latter to the housing and will thereby arrest the shaft 27 and the internal gear 25.

Figure 1:
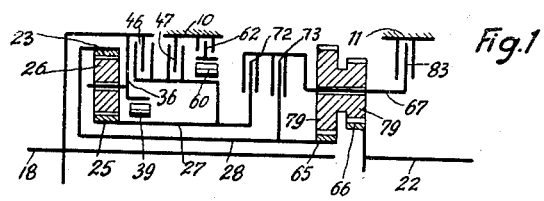
Fig. 1 is a diagrammatic representation of the transmission shown in Fig. 6.
Figure 2:
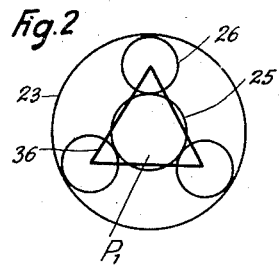
Fig. 2 is a diagrammatic view of the first epicyclic gear train.
Figure 3:
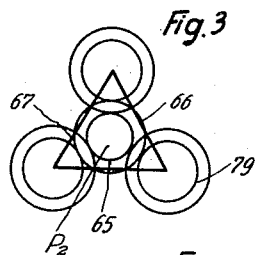
Fig. 3 is a diagrammatic view of the second epicyclic gear train.
Figure 4:
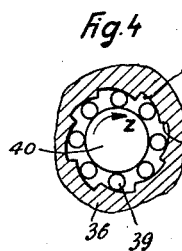
Fig. 4 is a diagram ilustrating the main one-way clutch.
Figure 5:
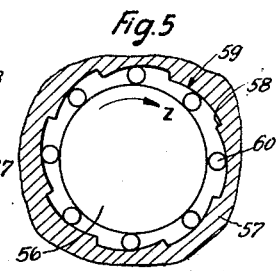
Fig. 5 is a diagram illustrating the counter one-way clutch.

A one-way brake referred to hereinafter as the "counter one-way brake" and adapted to be rendered active and inactive by a friction brake is interposed between the housing and the sun gear 25. To this end member 56 connected with the sun gear 25 for common rotation being splined on shaft 27 is surrounded by a clutch ring 57 which has internal pockets formed by radial walls and slanting walls 59 as shown in Fig. 5, said pockets including clamping rollers 60 engaging member 56 and preventing anti-clockwise rotation thereof relative to the clutch ring 57 with reference to Fig. 5.

The clutch ring 57 is positioned between the wall 14 and a washer held in position within the cylindrical flange of wall 14 by a split ring 61.

The ring 57 has a conical circumference engaged by the conical internal face of an annular piston 62 which is axially slidably mounted in a recess 63 of the wall 14. In such wall a conduit indicated by the dash-dotted line 64 is provided for the admission of a fluid under pressure to the recess 63, whereby the annular piston 62 will be urged to the left thus wedging itself firmly between the cylindrical flange of wall 14 and the clutch ring 57, whereby the latter will be arrested rendering the counter one-way brake 57—60 active. The cone angle of the elements 57 and 62 is so chosen that upon relief from fluid pressure the piston 62 will slide back to its initial disengaging position releasing clutch ring 57 and thus rendering the counter one-way brake inactive.

Housing section 11 encases a second epicyclic gear train comprising a pair of adjacent co-axially mounted sun gears 65 and 66 and three planetary compound gears 79 meshing therewith and rotatably mounted on a planetary gear carrier 67.

The sun gear 65 is splined on the hollow shaft 28 and thus connected for common rotation with the internal gear 23. The sun gear 66 is splined on the driven shaft 22 being held thereon by an annular nut 68. The planetary gear carrier 67 is freely rotatably mounted on the hub 69 of the gear 65 which is held against axial displacement on shaft 28 by a ring-shaped nut 70 engaging threads on the end of shaft 28.

Two disengageable clutches are provided to clutch the planetary gear carrier 67 to the shaft 27 and/or to the shaft 28 respectively, each of such clutches being adapted to be actuated by fluid pressure. For that purpose the planetary gear carrier 67 is provided with a cylindrical flange 71 which surrounds two groups 72 and 73, respectively, of conical sheet metal rings. Each group of sheet metal rings may be radially expanded and has radial projections which upon such expansion engage flange 71 for common rotation therewith. The group 72 is mounted in a cage 74 which is splined to shaft 27 and constitutes a cylinder slidably accommodating a ring-shaped piston 75 which by fluid pressure acting on its left face may be pressed against the group 72 of conical sheet metal rings thereby flattening and radially expanding the same to clutch the planetary gear carrier 67 to shaft 27. Similarly, the group 73 is mounted in a cage 76 splined on shaft 28 and slidably accommodating a ring-shaped piston 77. When fluid pressure acts on the right hand face of piston 77, the latter will engage the group 73 of conical rings flattening and expanding the same into frictional engagement with flange 71 of the planetary gear carrier 67 which is thereby clutched to shaft 28.

Moreover, the planetary gear carrier 67 may be locked to the housing to be arrested. For that purpose the planetary gear carrier includes a ring-shaped disk 78, which is fixed to projections (not shown) formed on gear carrier 67 between the twin planetary gears 79. Studs 80 on which the twin planetary gears 79 are journalled extend between and are mounted in the elements 67 and 78. The element 78 has external teeth engaged by internal teeth of an axially slidable clutch member 81 having oppositely tapering peripheral faces adapted to engage mating internal conical faces of clutch members 82 and 83. The clutch members 82 and 83 are mounted in casing section 11 for axial displacement, but are held against rotation therein. For that purpose they have external splines engaging internal grooves 84 provided in the housing section 11. While the clutch member 82 rests on an internal shoulder of housing section 11, the clutch member 83 is normally urged into engagement with the clutch member 81 by a plurality of helical springs 85 which are supported by a cage member 86 mounted in housing section 11 and held in place by a split ring 87 engaging an external groove of a cylinder 88. The latter rests on the cylindrical sleeve-shaped portion 20 of cover 19. The cylinder 88 has a flange 89 which engages an internal cylindrical face of the clutch member 83 and is sealed thereagainst by a piston ring.

Moreover, the clutch member 83 has a hub portion slidably fitted on the cylinder 88. By admission of fluid pressure to the space 90 between the flange 89 and the hub portion of clutch member 83 the latter may be urged to the right, whereby clutch ring 81 will be released permitting rotation of the planetary gear carrier 71.

For the admission of fluid pressure for actuation of the elements 49, 62, 75, 77 and 90, suitable conduits are provided, which are diagrammatically indicated in Fig. 6 by dash-dotted lines. They are formed by suitable bores in the various elements and by communicating grooves provided in the nested sleeves. A detailed description is deemed dispensable herewith. Some of said conduits are provided in wall 14 and others in shaft 32. Also the cover 19 is provided with an appropriate bore for that purpose.

From the foregoing detailed description it will appear that the driving shaft 18, which may be a shaft driven by the engine of a motor vehicle through the intermediary of a disengageable clutch, drives the planetary gear carrier 36 of the first epicyclic gear train $P_1$. The internal gear 23 meshing therewith is rigidly connected with the smaller sun gear 65 of the second epicyclic gear $P_2$ by means of the hollow shaft 28, the larger sun gear 66 being connected with the outgoing shaft 22 which may drive the wheels of the motor vehicle by means of an axle transmission.

Shunted across the primary driving train including the hollow shaft 28 connecting the two epicyclic gear trains $P_1$ and $P_2$, there is a secondary driving train including the hollow shaft 27 connecting the sun gear 25 of the epicyclic gear train $P_1$ with the planetary gear carrier 67 of the seond epicyclic gear train $P_2$, such secondary driving train of elements being adapted to be interrupted by disengagement of the clutch 72. In this secondary train the shaft 27 is enabled, on the one hand, by the one-way clutch 39 to brace itself against or lock with the planetary gear carrier 36 and, on the other hand, by the counter one-way brake 60 to brace itself against the housing 10, the clutch ring 57 connected with the housing being adapted to be released therefrom by disengagement of the friction device, i. e. brake 62. The one-way clutch 39 and the counter one-way brake 60 always act in opposite directions of rotation in such a manner that when the sun gear 25 tends to overtake the carrier 36, the one-way clutch 39 will become effective but will interrupt the train of elements, when the opposite relative rotation takes place. The counter one-way brake 60, however, permits the sun gear 25 and the shaft 27 rigid therewith to revolve in clockwise direction with reference to Fig. 5 relative to the housing 10 but will lock the shaft 27 to the housing when shaft 27 tends to rotate in reverse direction, i. e. opposite to arrow z, provided that the brake 62 is engaged.

In order to permit a direct drive through the epicyclic gear train $P_1$ a disengageable clutch 46 is connected between the driving shaft 18 and hollow shaft 27 in parallel with one-way clutch 39, and a releasable brake 47 is provided in shunt across the counter one-way brake 60. Associated with the epicyclic gear train $P_2$ there is the clutch 73 adapted to rigidly connect the planetary gear carrier 67 with the sun gear 65 and to thus shift the epicyclic gear train $P_2$ to direct. The brake 83 permits the planetary gear carrier 67 to be arrested.

The transmission operates as follows:

The brake 62 is normally engaged being disengaged by the operator for the purpose only of backing the vehicle. For that purpose conduit 64 may be fed with oil under pressure supplied by gear pumps geared to the driving shaft 18 and the driven shaft 22 respectively, a suitable valve being provided to temporarily exhaust conduit 64 while the vehicle is to be reversed.

Figure 7:
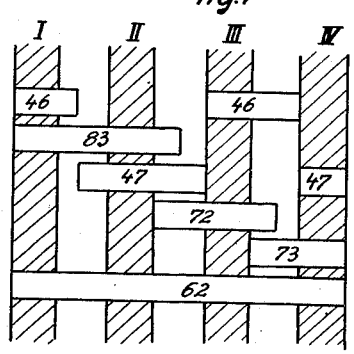
Fig. 7 is a time chart.

The diagram shown in Fig. 7 is a time chart showing the successive periods in the operation of starting the vehicle in which the transmission is shifted to first, second, third and fourth speed indicated by Roman numerals and showing the intermediate intervals. The horizontal bars in this chart show the durations of the engagement of the various clutches and brakes. Thus it will appear as above stated that clutch 62 is engaged during the entire starting operation.

*First speed*

The clutch 46 and the brake 83 are engaged. As a result the epicyclic gear train $P_1$ will transfer the speed directly, while the epicyclic gear train $P_2$ will be operative because of the planetary gear carrier 67 being arrested to reduce the speed.

*Transition to second speed*

Clutch 46 is disengaged. Provided the engine maintains the driving torque imparted to shaft 18, the main one-way clutch 39 will lock because of the resistance offered to the planetary gears 26 by the internal gear 23 causing the sun gear 25 to attempt overtaking the planetary gear carrier 36. Therefore, the first speed condition will be maintained. If, however, the engine is throttled causing shaft 22 to drive shaft 18, the one-way clutch 39 releases the sun gear 25 tending to rotate in reverse direction because of the resistance offered by the planetary gear carrier 36. The counter one-way brake 60, however, will arrest the shaft 27. Therefore, the speed transfer will be affected in the epicyclic gear train $P_1$ under second-speed conditions.

*Second speed*

In order to render the transmission effective in both directions of power transfer to maintain the second-speed condition, the brake 47 is engaged, after the clutch 46 has been disengaged. The brake 47 will take over the function of the counter one-way brake 60 in both directions of transfer arresting the sun gear 25. As a result, the epicyclic gear train $P_1$ increases the speed while the epicyclic gear train $P_2$ reduces the increased speed, the two ratios being so chosen that the driven shaft 22 will rotate slower than the driving shaft 18.

*Transition to third speed*

As shown in Fig. 7 the clutch 72 is engaged first. Since the shaft 27 is arrested by the brake 47 and since the planetary gear carrier 67 is arrested by the brake 83, the clutch 72 can be engaged while in relieved condition. Therefore, no slippage can occur in clutch 72 while the same is being engaged. After completion of the engagement of clutch 72 the brake 83 will be disengaged as shown in Fig. 7. Since at this time the carrier 67 is also arrested by action of the elements 72 and 47, no slippage occurs in the brake 83 during the disengagement thereof. Upon completed disengagement of brake 83, the brake 47 will be disengaged whereby the following conditions will be established:

When the engine keeps driving, the main one-way clutch 39 releases the sun gear 25 tending to rotate rearwardly relative to the carrier 36 because of the resistance offered by the sun gear 66 effective through the shafts 27 and 28. At the same time the counter one-way brake 60 locks the sun gear 25, the hollow shaft 27 thereof and the carrier 67. Therefore, the second-speed conditions are preserved under the effect of the driving torque produced by the engine. When the engine is throttled causing the wheels of the vehicle to drive the engine thus reversing the power transfer, the sun gear 25 tends because of the resistance offered by the carrier 36 to overtake the carrier but is prevented from doing so by the main one-way clutch 39. However, the counter one-way brake 60 permits the driving effect produced by shaft 22. Therefore, the epicyclic gear train $P_1$ is blocked in the same manner as the train $P_2$ resulting in the third-speed condition.

From the foregoing will appear that during the transitional period when the transmission is shifted from second to third speed the one-way clutch 39 acts as the counter one-way device whereas the one-way brake 60 acts in this case as the main one-way device.

*Third speed*

For shifting the transmission to third or direct speed the clutch 46 is engaged again thereby blocking the epicyclic gear train $P_1$ in itself. The planetary gear train $P_2$ is similarly blocked too because of the engagement of clutch 72 rigidly connecting the carrier 67 with the sun gear 65. As a result, the shafts 18 and 22 revolve in unison.

*Transition to fourth speed*

First clutch 73 is engaged and thereafter clutch 72 is disengaged. By the engagement of the clutch 73 the planetary gear train $P_2$ blocked already via the train $P_1$, will be blocked in itself independently of train $P_1$, such blocking operation taking place while the elements of clutch 73 rotate synchronously no torque being transferred by clutch 73 at this time. Similar conditions prevail, when clutch 72 is disengaged subsequently. Therefore, the clutch 73 simply takes over the function of clutch 72. The subsequent disengagement of clutch 46 results in the following driving conditions:

When the engine produces power, the one-way clutch 39 now acting again as the main one-way clutch will prevent the sun gear 25 from overtaking the carrier 36 under the effect of the resistance offered by the internal gear 23. As a result, the epicyclic gear train $P_1$ remains blocked in itself. The counter one-way brake 60 releases the shaft 27 for clockwise rotation. Upon reversal of the power transfer, however, the carrier 36 will resist rotation and the driving internal gear 23 will tend to rotate the sun gear 25 in reversed direction. Such reverse rotation while permitted by the one-way clutch 39 is prevented by the one-way brake 60. Therefore, the sun gear 25 is arrested resulting in a second-speed operation of the epicyclic gear train $P_1$ which increases the speed. Since the epicyclic gear train $P_2$ is blocked in itself at this time the aggregate ratio of transmission between the shafts 18 and 22 represents the fourth speed causing shaft 22 to run faster than shaft 18.

Fourth speed

For the purpose of definitely establishing the fourth gear condition, the brake 47 is engaged again arresting the sun gear 25 positively whereby in both directions of transfer the speed of shaft 22 will be increased over that of shaft 18.

The reversed gear shifting operation from fourth speed to first speed is effected by the reversed succession of steps. In order to shift back to third, first brake 47 is disengaged whereupon clutch 46 is engaged. Subsequently, clutch 72 is engaged and clutch 73 is disengaged. The transmission will be shifted from third to second speed by first disengaging clutch 46 then engaging brake 47 then engaging brake 83 and disengaging clutch 72. For shifting the transmission from second to first speed the operator disengages brake 47 and engages clutch 46.

It will be recalled from what has been explained with reference to the friction devices, i. e. clutches and brakes, 72, 73 and 83 that the same are actuating in synchronized or stationary condition only. During the transition from second speed to third speed or vice versa the devices 72 and 73 are actuated while at rest. During the transition from third to fourth speed or vice versa the devices 72 and 73 are actuated while revolving synchronously, the trains $P_1$, $P_2$ being in "direct" condition. Therefore, no energy will be dissipated coincidentally to the actuation of these friction devices. For that reason such devices may be made compact and simple, as described to Fig. 6. In lieu of clutches of the expandable ring type shown in Fig. 6 at 72 and 73, toothed clutches or cone clutches may be employed.

The use of the spring 51 for the engagement of the clutch 46 and the use of spring 85 for engagement of clutch 83 involve the advantage that no fluid pressure is required to start the vehicle in first speed. Therefore, the fluid under pressure may be supplied by a single pump geared to shaft 22 in dependence on the speed of the vehicle. Such pump can be made comparatively small since the two one-way clutches arranged in shunt prevent any interruption of the power transfer during the transitional intervals. Hence, the time required to actuate the various pistons by the pressure fluid will not affect the reliability of the gear shifting operation.

A reversing gearing enabling the driver to back the vehicle may be interposed between the customary disengageable friction clutch and shaft 18 or between shaft 22 and the axle transmission.

Preferably the valve controlling conduit 64 will be so connected with the means controlling the reversing gearing as to automatically put conduit 64 on exhaust when the reversing gearing is put in operation.

The one-way clutch 60, when put in operation by admission of pressure fluid to conduit 64, will hold the vehicle against coasting backwards on hills.

From the foregoing explanations the essence of my invention will be readily understood.

However, for a better and clearer understanding of the operation of the transmission in accordance with the present invention, reference may be had to the following chart indicating the function of the various parts during the different speeds of the transmission.

| Speed | Comments | Clutch 46 | Brakes 47 | Brakes 62 | Clutches 72 | Clutches 73 | Brake 83 | One-Way Devices 39 | One-Way Devices 60 | Epicyclic Gears P1 | Epicyclic Gears P2 |
|---|---|---|---|---|---|---|---|---|---|---|---|
| 1st | | x | — | x | — | — | x | — | — | direct | reduce. |
| 1st-2nd | I drives O / O drives I | — | — | x | — | — | x | lock | lock | direct / increase | reduce / reduce. |
| 2nd | | — | x | x | — | — | x | — | — | increase | reduce. |
| 2nd-3rd | I drives O / O drives I | — | — | x | x | — | — | — / lock | lock / — | increase / direct | reduce / direct. |
| 3rd | | x | — | x | x | — | — | — | — | direct | direct. |
| 3rd-4th | I drives O / O drives I | — | — | x | — | x | — | lock / — | — / lock | direct / increase | direct / direct. |
| 4th | | — | x | x | — | x | — | — | — | increase | direct. | x=engaged; —=disengaged; I=input 18 from engine; O=output 22 to wheels.

According to an important feature of my invention one-way clutches are provided common to both directions of power transfer for the transmission of the driving torque and for bracing the elements of the epicyclic gear trains enabling the shifting operation in either train, one of said trains being braced at any time on the common one-way clutch through the disconnectable driving connection. Preferably, two one-way clutches only are provided in a transmission including two epicyclic gear trains each providing for two ratios of transmission, one of said one-way clutches acting as the main one-way clutch when one or the other epicyclic gear train is shifted, while the other one-way clutch acts as a counter one-way clutch. Preferably, the arrangement is such that one of the two one-way clutches acts as the main one-way clutch when one of the epicyclic gear trains is shifted, while the other one of the two one-way clutches acts in the opposite sense as a counter one-way clutch when the other epicyclic gear train is shifted.

According to another feature of my invention some of the friction devices, particularly the clutches, are actuated in a condition in which the elements thereof revolve synchronously or are at rest so that there will be no relative rotation. That applies particularly to the brakes which are not arranged in shunt with a one-way clutch.

It is preferable during the transitional period from one speed to another before actuating the clutch changing the ratio of transmission, e. g. during the transition from the second speed to the third speed, to first effect an idle actuation not apt to cause an immediate change of the ratio of transmission, for instance by engaging a clutch, and to subsequently disengage a friction device while the elements thereof are free from relative rotation, such idle actuation being effective only to change the driving connection and to preselect the change of the ratio, whereas such change will really be effected in the subsequent actuation of the first mentioned device.

Such an actuation of clutches or brakes, while the elements thereof are free from relative rotation being either at rest or synchronized, results in the particular advantage that the clutches or other friction devices will operate without friction losses and, therefore, may be constructed as simple expandable ring devices, or cone devices, or toothed clutch devices which may be actuated by axially movable fluid-operated pistons. Because of the absence of wear or heat production, such friction devices may carry a very high specific load and, therefore, can be made very small and of low weight.

While I have described a preferred embodiment of my invention, I wish it to be clearly understood that the same is not limited to the details described, but is capable of numerous modifications within the scope of the appended claims.

What I claim is:

1. In a change speed transmission, the combination comprising a relatively stationary part, a driving member, a driven member, a pair of epicyclic gearings arranged between said members and each having a plurality of operatively interconnected elements, said driving member being drivingly connected to one of said elements of one of said gearings and said driven member being also drivingly connected with one of said elements of the other one of said gearings, a plurality of friction devices, means operatively connecting each of said friction devices with two parts consisting of either two of said elements of said epicyclic gearings or one of said elements and said relatively stationary part to variably determine the ratio of transmission of either one of said gearings, means constituting a main train of motion-transmitting elements and including an element of each of said two epicyclic gearings for drivingly interconnecting said pair of epicyclic gearings, means constituting an auxiliary train of motion transmitting elements separate from said main train of motion transmitting elements and including another element of each of said epicyclic gearings for drivingly interconnecting said pair of epicyclic gearings, said auxiliary train of motion transmitting elements being composed of a first section connected to one of the elements of one of said epicyclic gearings, of a second section connected to one of the elements of the other of said epicyclic gearings and of one of said friction devices connecting said two sections, and two one-way engaging means operatively connected with said first section of said auxiliary train and in parallel with two of said friction devices for taking over the function of two of said friction devices during shifting of the transmission.

2. A speed-change transmission as claimed in claim 1 in which the epicyclic gearing connected with said first section of said auxiliary train of motion-transmitting elements includes a sun gear connected by said first section of said auxiliary train of elements to said one friction device, and in which the other epicyclic gearing connected with said second section of said auxiliary train of elements includes a planetary gear carrier connected by said second section to said one friction device.

3. A speed-change transmission as claimed in claim 1 in which said one friction device comprises two relatively rotatable members for actuation only when the relative rotation of said members is zero.

4. A speed-change transmission as claimed in claim 1 in which said one friction device is adapted to be actuated in relieved condition prior to the actuation of another one of said friction devices, whereby a speed change is preselected for subsequent effectuation by the actuation of one of said friction devices.

5. A speed-change transmission as claimed in claim 1 in which some of said friction devices are adapted to lock said epicyclic gearings in themselves for the direct transfer of rotation, and further comprising means operative upon locking of one of said epicyclic gearing is locked in itself to co-operatively connect both of said epicyclic gearings by engaging said one friction device forming part of said auxiliary train of motion-transmitting elements, whereby the driving torque will be transferred in either direction directly.

6. The combination claimed in claim 1 further comprising springs operatively connected with those of said friction devices which in engaged condition set the transmission to the lowest speed, said springs tending to engage said devices.

7. The combination claimed in claim 1 in which means are provided to disable at least one of said one-way engaging means.

8. The combination claimed in claim 1 in which one of said one-way engaging means includes a rotatable member, said transmission being provided with a housing and with a releasable brake operatively connected with said housing and said member and adapted to arrest the same to render said one-way engaging means active and to release said member to render said one-way clutch inactive.

9. A speed-change transmission as claimed in claim 1 comprising a housing having a transverse wall intermediate its ends, said wall being provided with bores extending lengthwise therein, and fluid-operable pistons operatively connected with and adapted to actuate said friction devices including conduits for supplying fluid under pressure to said pistons, some of said conduits being constituted by said bores.

10. In a change speed transmission with a relatively stationary part, the combination comprising a driving member, a driven member, two planetary gearings arranged in tandem between said members, each planetary gearing including three transmission elements consisting of a planet carrier and two central gears, said driving member being connected with one element of one of said gearings and said driven member being connected with one element of the other one of said gearings, a first driving connection between a second element of said one gearing and a second element of said other gearing, a second driving connection between the third element of said one gearing and the third element of said other gearing, first disengageable clutch means connected between said driving member and said second driving connection, second disengageable clutch means between said second driving connection and said third element of said other gearing, first brake means for braking said second driving connection, second brake means for braking said third element of said other gearing, first one-way engaging means between said driving member and said second driving connection, and second one-way engaging means between said second driving connection and said relatively stationary part, said two one-way engaging means being operative to effect engagement thereof with respect to said second driving connection in opposite directions of rotation of said last-mentioned driving connection respectively.

11. In a change speed transmission, the combination according to claim 10, wherein said first element of said one gearing is the planet carrier thereof, and said first element of said other gearing is one of said central gears.

12. In a change speed transmission, the combination according to claim 11, wherein said second element of said one gearing is one of said central gears, said second element of said other gearing being the other one of said central gears, the third element of said one gearing being the other one of said central gears, and said third element of said other gearing being the planet carrier thereof.

13. In a change speed transmission, the combination according to claim 12, wherein said one central gear of said one gearing is a sun gear and said other central gear of said one gearing is a ring gear, both of said central gears of said other gearing being two sun gears of different diameter, the sun gear connected with said driven member being the larger of said two sun gears, and said other gearing further including twin planetary gears pivotally supported together on the planet carrier of said other gearing.

14. In a change speed transmission the combination according to claim 10, further comprising another clutch means for coupling together two elements of said other gearing.

15. In a change speed transmission, the combination according to claim 10, further comprising disengageable means between said second-mentioned engaging means and said relatively stationary part.

16. In a change speed transmission, the combination according to claim 11, wherein said first disengageable clutch means and said first one-way engaging means each directly connect said planet carrier and said one central gear of said one epicyclic gearing.

17. In a change-speed transmission, the combination according to claim 10, wherein both of said engaging means are so constructed that with said driven member overtaking said second drive connection during forward rotation thereof said first engaging means interrupts the drive and with said second drive connection rotating in a forward direction said second one-way engaging means interrupts the drive.

18. A change-speed transmission comprising a relatively stationary part, a driving member, a driven member, a pair of epicyclic gearings arranged in tandem between said members, each of said epicyclic gearings including a plurality of operatively interconnected transmission elements, said driving member being connected with one transmission element of one of said gearings and said driven member being connected with one transmission element of the other one of said gearings, one-way engaging means and disengageable means each operatively connected with either two of said elements or one of said elements and said relatively stationary part for variably determining the transmission ratio of said transmission, one of said disengageable means being operatively connected between two elements of one of said gearings to lock the same, said one-way engaging means being connected in parallel with some of said disengageable means to take over the functions of said last-mentioned disengageable means during a change in transmission ratio, means forming a train of elements and connected between a transmission element of each of said gearings for transmitting motion from one of said gearings to the other gearing, means forming an auxiliary train of elements connecting two other transmission elements of said two epicyclic gearings and including one of said disengageable means, and the one one-way engaging means which is connected in parallel with said one disengaging means being effective during power transfer in at least one direction to lock one of said epicyclic gearings when said one disengageable means is disengaged.

19. A change-speed transmission according to claim 18, wherein the epicyclic gearing adjacent to and operatively connected to said driven member includes twin planetary gears, and means for connecting said driven member only with one of said twin planetary gears to provide for a connection between said driven member and said speed-change transmission.

20. A change-speed transmission as claimed in claim 18, in which each of said epicyclic gearings is of the type having two transmission ratios, one of said one-way engaging means being operative during any transition from one speed to another speed to act as a main one-way engaging means and the other one of said one-way engaging means being operative during said transition to act as a counter one-way engaging means, whereby during said transition the ratio of transmission will be kept between said speeds.

21. A change-speed transmission claimed in claim 18, in which two one-way engaging means are provided, said two one-way engaging means being operatively connected with said pair of epicyclic gearings so that when the disengageable means operatively connected with one of said epicyclic gearings is actuated to change the ratio of transmission thereof, one of said one-way engaging means acts as a main one-way engaging means, while the other of said one-way engaging means acts as a counter one-way engaging means, and so that when the disengageable means operatively connected with the other one of said epicyclic gearings is actuated to change the ratio of transmission thereof, said first-mentioned one of said one-way engaging means acts as a counter one-way engaging means, while said other one of said one-way engaging means acts as a main one-way engaging means.

22. A change-speed transmission as claimed in claim 18, in which, when the transmission is shifted to higher speeds, one of said disengageable means is actuated in the relieved condition thereof to thereby preselect a higher speed, whereupon another one of said disengageable means is actuated under load to effectuate the gear shifting operation, whereas, when the transmission is shifted to lower speeds, one of said disengageable means is first actuated under load, whereupon another one of said disengageable means is actuated in relieved condition.

23. A change-speed transmission as claimed in claim 18, in which said disengageable means and said one-way engaging means are so arranged that upon any shifting operation from one speed to another only one of said devices need be actuated at any time, and that the transfer of the driving torque will not be interrupted.

24. The combination as claimed in claim 18, in which some of said disengageable means are of the type adapted to be actuated in relieved condition only.

25. The combination as claimed in claim 18, in which some of said disengageable means are of the type having radially expandable conical sheet-metal rings and a hollow member embracing said rings and adapted to be engaged along the periphery thereof.

26. The combination as claimed in claim 18, in which said disengageable means include multi-disk friction clutches adapted to be engaged and disengaged under load.

27. The combination as claimed in claim 18, in which fluid operable pistons are operatively connected with said disengageable means for the actuation thereof.

28. A change-speed transmission having a plurality of transmission ratios in the forward direction of rotation comprising a relatively stationary part, input means, output means, epicyclic gear means having a plurality of operatively interconnected elements and operatively connected with one element thereof to said input means, epicyclic gear means having a plurality of operatively interconnected elements and operatively connected with one element thereof to said output means, two separate motion transmitting means each connecting a respective element of one of said epicyclic gear means with a respective element of the other of said epicyclic gear means, and a plurality of disengageable means and one-way engaging means each operatively connected between two parts consisting either of two elements of said epicyclic gear means or of one element of said epicyclic gear means and said relatively stationary part to provide a plurality of transmission ratios, each one-way engaging means being connected in parallel with a respective disengaging means to take over the function of the latter during shifting from one transmission ratio to another and thereby provide predetermined transmission ratios during transitional shifting operations.

29. A change-speed transmission according to claim 28, wherein said disengageable means are operative to vary the transmission ratio of said transmission only in said forward direction of rotation.

30. A change-speed transmission according to claim 28, wherein one of said two separate motion transmitting means includes a disengageable means having two clutch halves, and wherein each one-way engaging means is operatively connected on one side thereof for common rotation with one of said clutch halves.

References Cited in the file of this patent

UNITED STATES PATENTS

| 2,349,410 | Normanville | May 23, 1944 |
| 2,645,137 | Roche | July 14, 1953 |
| 2,679,768 | Baule | June 1, 1954 |
| 2,682,786 | Flinn | July 6, 1954 |

FOREIGN PATENTS

| 14,114 | Great Britain | Apr. 23, 1908 |